Feb. 18, 1941.　　　　　S. KHALIL　　　　　2,232,114
APPARATUS FOR CONTROLLING THE STOPPING OF CARRIAGES
Filed Feb. 24, 1938　　　　8 Sheets-Sheet 1

INVENTOR
SEYED KHALIL
BY
Van Deventer & Grier
ATTORNEYS

Feb. 18, 1941. S. KHALIL 2,232,114
APPARATUS FOR CONTROLLING THE STOPPING OF CARRIAGES
Filed Feb. 24, 1938 8 Sheets-Sheet 2

INVENTOR
SEYED KHALIL
BY Van Deventer & Grier
ATTORNEYS

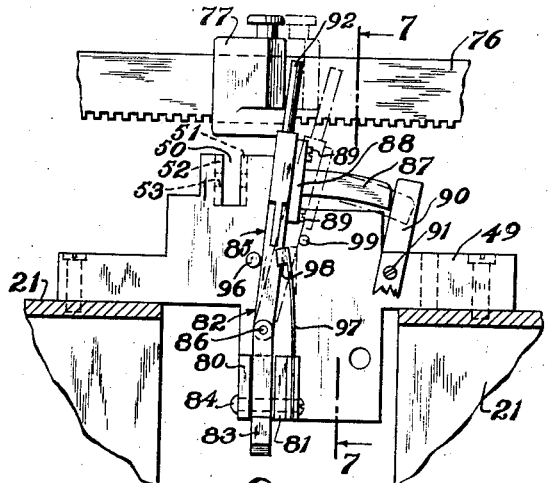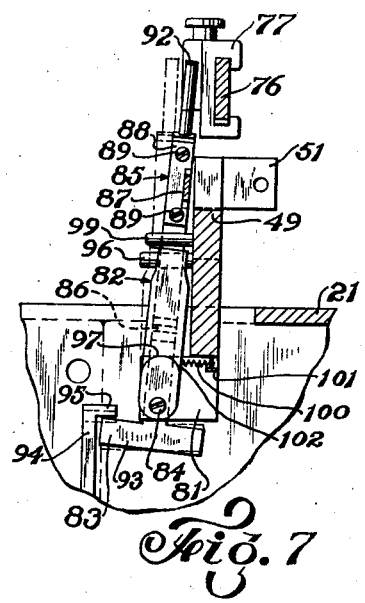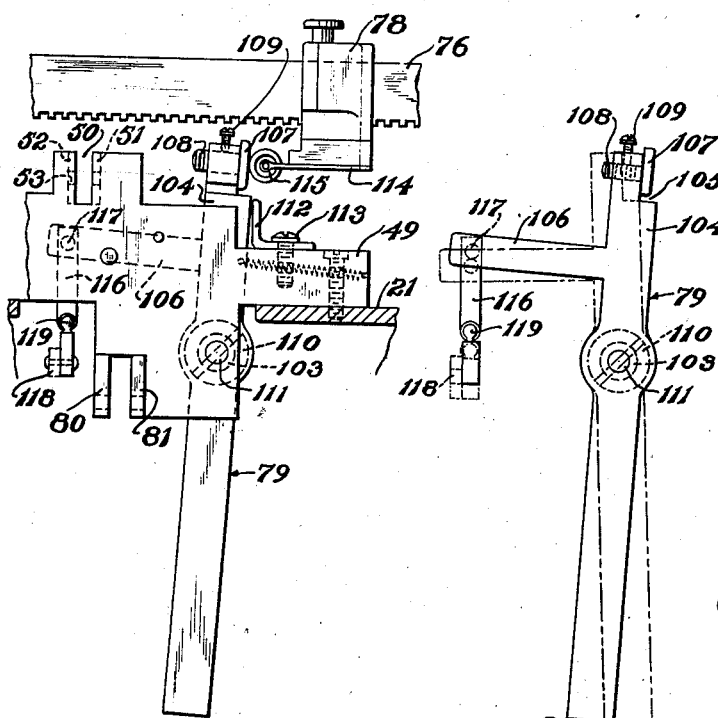

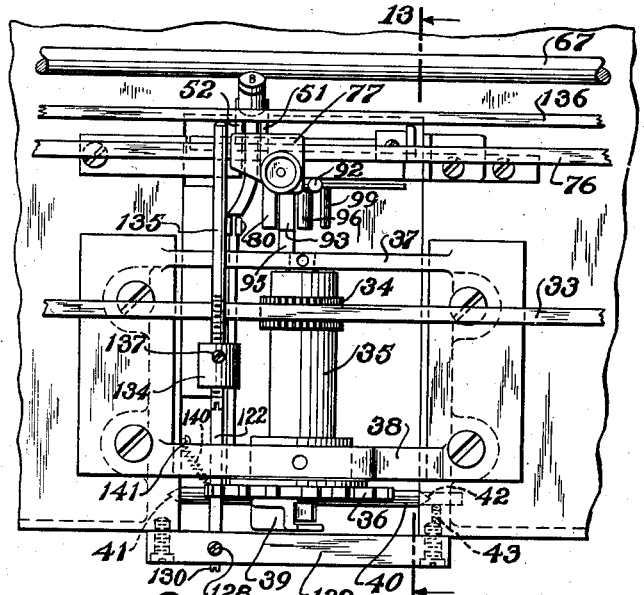

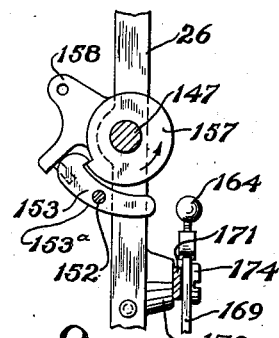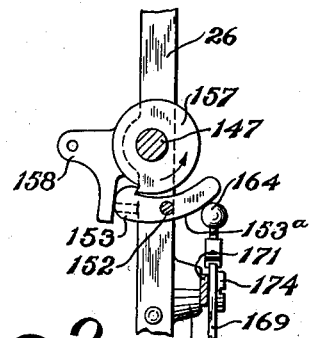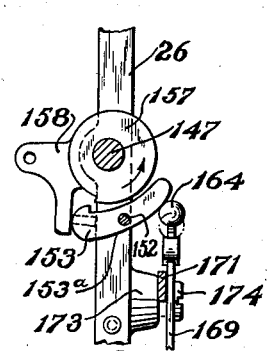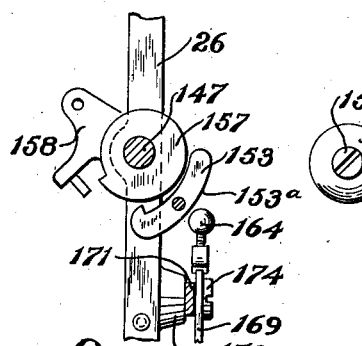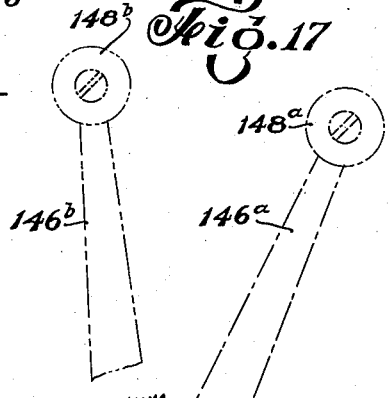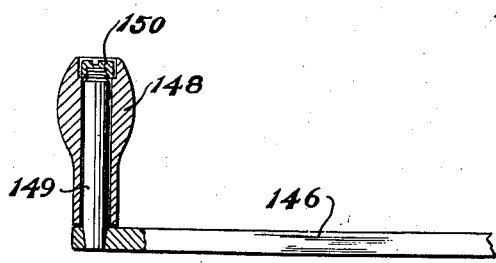

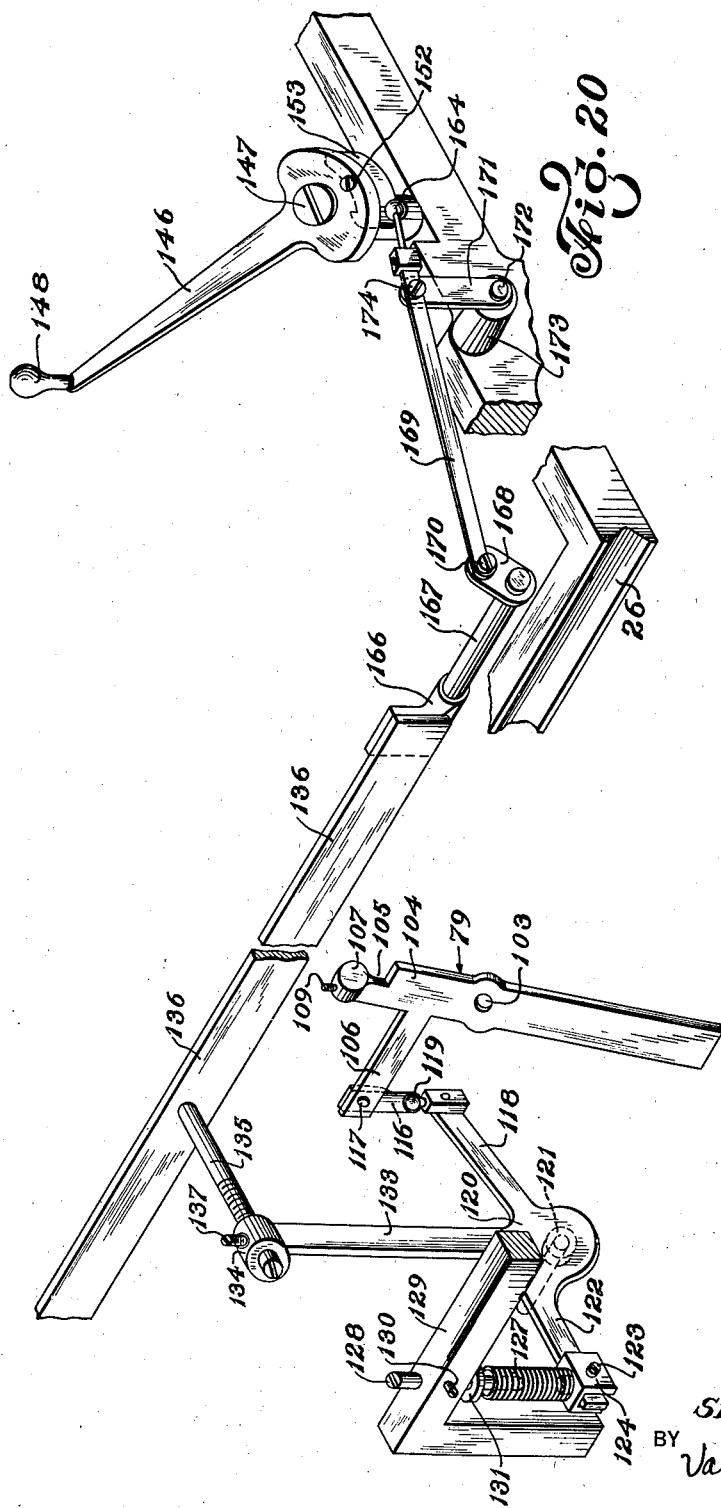

Feb. 18, 1941.  S. KHALIL  2,232,114
APPARATUS FOR CONTROLLING THE STOPPING OF CARRIAGES
Filed Feb. 24, 1938  8 Sheets-Sheet 8
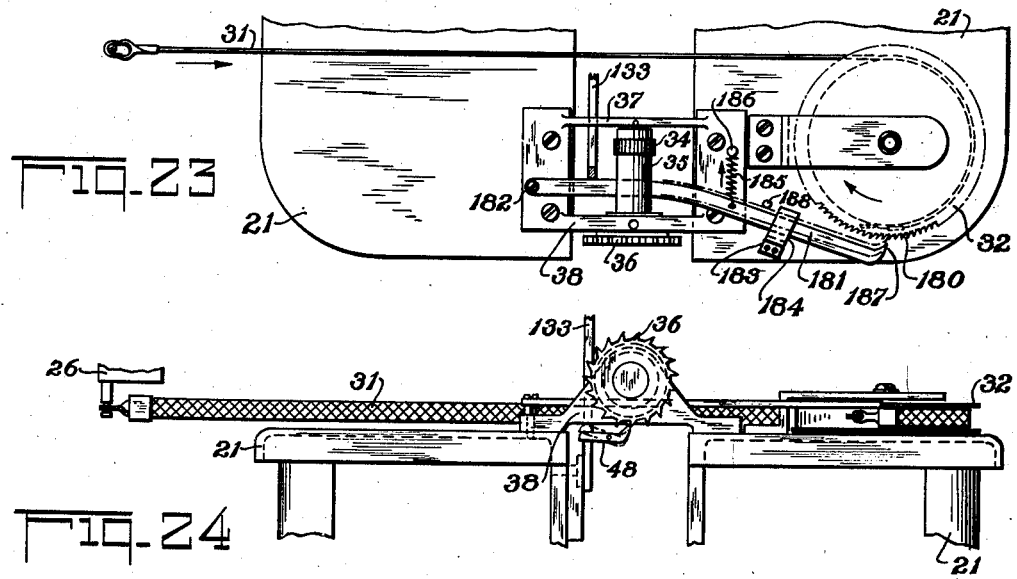
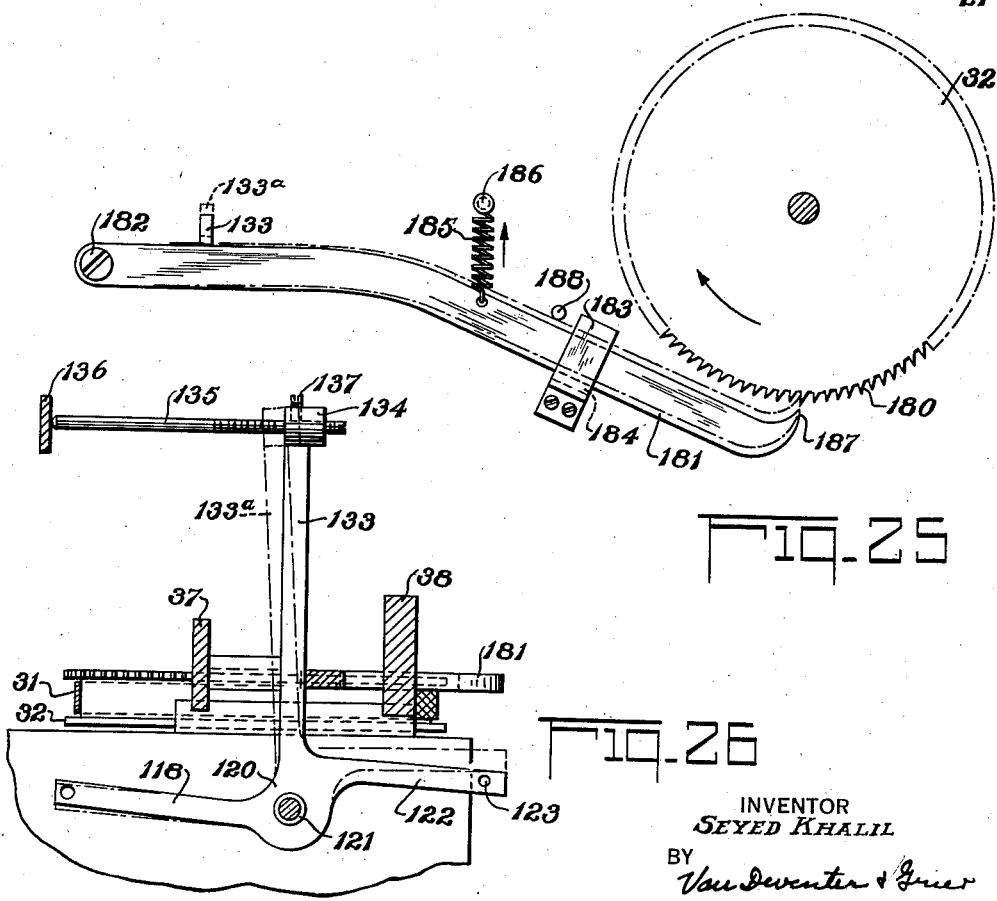
INVENTOR
*Seyed Khalil*
BY
*Van Deventer & Grier*
ATTORNEYS Patented Feb. 18, 1941

2,232,114

UNITED STATES PATENT OFFICE 2,232,114

APPARATUS FOR CONTROLLING THE STOPPING OF CARRIAGES

Seyed Khalil, New York, N. Y., assignor to Remington Rand, Inc., New York, N. Y., a corporation of Delaware Application February 24, 1938, Serial No. 192,246

16 Claims. (Cl. 197—94)

This invention relates to typewriting and like machines, and more particularly to improved means for arresting the return movements of the carriages of such machines.

The principal object of the present invention is to provide improved mechanism for reducing the noise, shock and rebound ordinarily produced in arresting a typewriter carriage in its return movement to a position for starting a new line of typing.

A further object of the invention is to provide improved means for permitting a returning carriage to pass beyond the point of its ultimate arrest against the action of decelerating means, and for permitting the carriage to move back to this point of ultimate arrest after it has been completely decelerated in its movement in the returning direction.

Another object of the invention is to provide means associated with the usual adjustable margin stop for disengaging the normally effective escapement dog as the returning carriage reaches its point of ultimate arrest thereby permitting the carriage to pass beyond such point against the action of shock absorbing means until its return movement is fully decelerated, and for holding the escapement dog disengaged while the carriage moves back to this point of ultimate arrest whereupon it is stopped by the reengagement of the escapement dog.

Other objects, purposes and characteristic features of the present invention will appear as the description thereof progresses, during which, references will be made to the accompanying drawings, wherein—

Figure 4 is an elevation of the new and improved main stop control element in cooperative relation with the settable stop carried by the carriage;

Figure 5 is a view of the stop control member indicated in its two main positions;

Figure 6 is an elevation of the marginal release mechanism;

Figure 7 is a sectional view of the marginal release mechanism taken along the line 7—7 of Figure 6;

Figure 12 is a plan showing the cooperative relation between the mechanism shown in Figures 4 to 11, inclusive;

Figure 13 is an elevation, partly in section, taken along the line 13—13 of Figure 12;

Figure 14 is a plan view of the line-spacing and carriage-return lever indicating the positions of the lever at normal, at the moment at which line spacing is accomplished; and the position when moving the carriage to the right, the line spacing mechanism having been omitted from this view for the sake of clarity;

Figure 15 is a view of the pawl and ratchet associated with the line-spacing and carriage-return lever, said ratchet being shown in its normal position;

Figure 16 is a view of the ratchet shown in Figure 15, showing the position at the time line spacing is accomplished;

Figure 17 is a view of the pawl and ratchet shown in Figures 15 and 16 at the position where the stop control effects the release of the pawl from the ratchet;

Figure 18 shows the ratchet as having returned to its normal position ready to be re-engaged by the pawl, and the pawl which is carried by the lever having been disengaged, permits the lever to move freely and prevents the operator from delivering any further power to the carriage;

Figure 19 is a fragmentary view of the lever shown in Figure 14, showing details of the handle;

Figure 20 is an exploded view showing details of the linkages between the stop control element and the ratchet release of the line-spacing lever;

Figure 21 is a sectional elevation showing a modification of the resilient member shown in Figure 13 employing two concentric springs, one wound right-hand and the other left-hand;

Figure 22 shows a further modification of the resilient means shown in Figure 21 in which the resilient members may include parts made of rubber or the like;

Figure 23 is a plan view of mechanism for removing the urge of the main spring from the carriage under certain conditions;

Figure 24 is an elevation of the mechanism shown in Figure 23;

Figure 25 is an enlarged view showing the relation between the toothed spring drum and a pawl lever cooperating therewith; and Figure 26 is a fragmentary view showing the relation of the pawl lever to certain linkages associated with the stop control device.

Figure 1:
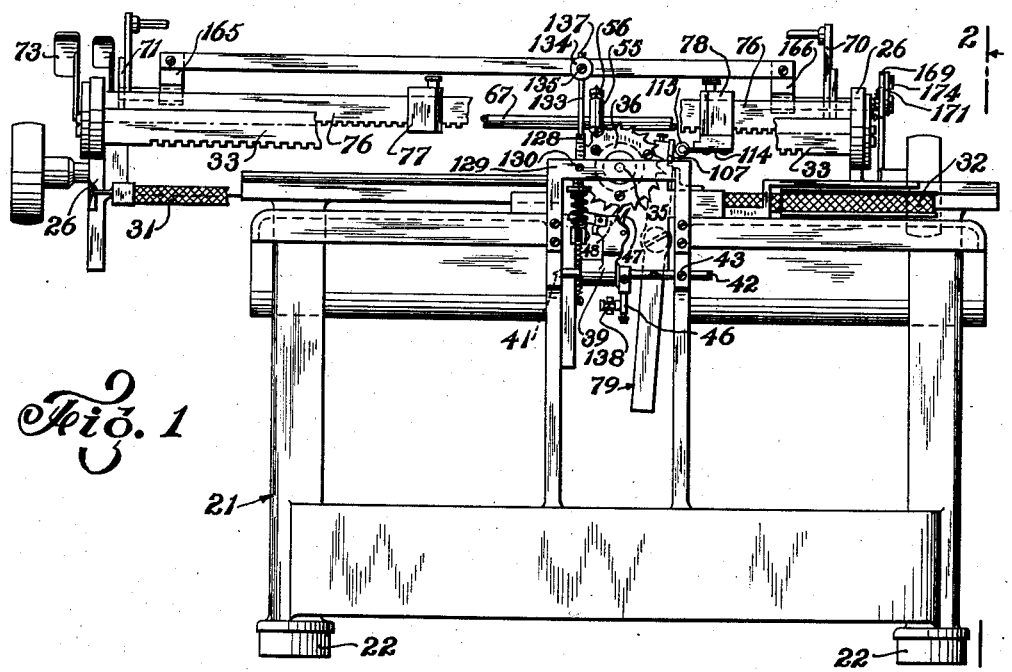
Figure 1 is a rear view of a typewriter incorporating the embodiments of the invention, certain parts having been omitted for the sake of clarity.

The devices of the present invention have been applied in the present instance to a typewriting machine of substantially conventional construction. However, it is to be understood that the principles of the present invention may be applied equally well to other typewriter constructions as well as to bookkeeping machines and other machines employing a carriage which is at times returned to a starting position.

The drawings show only as much of the usual typewriter construction as is necessary to arrive at a complete understanding of the present invention as applied thereto. The illustrated machine has a main frame 21 which is supported in the usual manner by feet 22. The keyboard includes printing keys 23, a space bar 24, and shift keys 25 and 25ª. A carriage 26 is provided with a platen 27, and a lever 28 is provided for line spacing the platen and returning the carriage to its initial position for starting a new line of printing.

The carriage is slidably supported on ways 29 and 30 and is drawn to the right, as viewed in Figure 1, by means of a strap 31 connected therewith at one end, and connected on the other end to a spring drum 32. To control the movement of the carriage 26 under the action of the spring drum 32, a rack 33 is mounted on the carriage 26 and is rigidly secured thereon in the illustrated machine. This rack meshes with a pinion 34 (Figure 3) which is operatively connected to an escapement shaft 35 and in the present instance is positively secured thereto. The escapement shaft 35 is journaled in bosses 37 and 38 carried by the main frame, and an escapement wheel 36 is operatively connected to the shaft 35 and may be positively secured thereto as may be seen by referring to Figures 12 and 13.

The control mechanism for the escapement wheel 36 includes an escapement dog support 39 which is provided with a pivot shaft 40 pivoted at 41 and 42, the pivot 42 being adjustable and, after the desired adjustment is obtained, is locked by means of a locking screw 43.

The escapement dog support 39 is provided with a spring 44 which urges the same toward its normal illustrated position. The spring 44 has one end secured to a pin 44ª in the frame member 49, and its other end secured to a downward extension 46 on the support 39. The extension 46 also carries a stud 138 which is engaged by a yoke member 139 associated with the universal bar in the machine.

The U-bar 144 rigidly secured to or forming an integral part of the frame, carries a set screw 143 which is provided with a lock nut 145 for locking the set screw in any desired adjustment. The end of the set screw 143 is set in such position as to form a stop for the dog support when the latter is moved in a clockwise direction by the yoke 139 which, as stated above, is actuated by the universal bar.

The U-bar also carries a set screw 154, which is provided with a lock nut 155. The end of the set screw contacts a boss 156 forming an integral part of the dog carrier 39. The set screw 154 may be set to engage the boss 156 and hold the dog carrier 39 in its normal position under the force of the spring 44.

Two escapement dogs 47 and 48 are mounted on the supporting member or rocker 39, and these dogs are arranged to cooperate alternately with the teeth of the escapement wheel 36 by rocking movement of the support 39 to thereby afford intermittent letter-spacing movement of the escapement wheel. The normally effective, or normally engaged dog 48 is disposed in front of the dog 47, and this dog 48 is pivotally mounted on the rocker 39 as may be seen in Figs. 1 and 8. The stop screw is adjusted so that the spring 44 normally holds the rocker 39 in a position wherein the normally engaged dog 48 is directly beneath the teeth of the escapement wheel 36. The normally engaged dog 48 is pivoted to the rocker 39 at a point intermediate the ends thereof, and spring means (not shown) act on the dog 48 to normally hold the right-hand end thereof (as viewed in Fig. 8) into engagement with one of the teeth of the escapement wheel 36.

Whenever one of the printing keys 23 or the space bar 24 is operated, the rocker 39 is moved in a clockwise direction (as viewed in Fig. 13) through the actuating member 139 in the usual manner. This movement of the rocker moves the normally engaged dog 48 bodily out of engagement with a tooth of the escapement wheel 36 and moves the other dog 47 into the path of one of the teeth. When the rocker 39 is allowed to return to normal position under the force of the spring 44, the dog 47 is moved out of the path of the escapement wheel teeth and the dog 48 is moved back into a position for engagement with a tooth to thereby arrest the letter spacing movement of the carriage in the usual manner. It will also be clear that when the rocker 39 is in its normal position, the normally engaged dog 48 may be operated about its pivot from its solid line position shown in Fig. 8 to its dotted line position shown in Fig. 10 thereby releasing the escapement wheel for movement in a clockwise direction for purposes which will hereinafter be more fully explained.

A supporting member 49 forming an extension of the frame 21 has a slot formed therein, and a pair of projecting bosses 51, 52, are positioned one on each side of the slot and carry a pivot pin 53 upon which is pivotally mounted a bell crank 54. One arm 54ª of the bell crank has a roller 55 pivotally supported thereon, and retained thereon by a fixed sleeve 56. The other arm 54ᵇ of the bell crank extends through the slot 50, and a bar 57 is pivotally connected thereto by means of a pin 58. The bar 57 extends downwardly and a notch 59 formed on the lower end thereof rests upon a lever 60 near the end 60ª thereof.

The lever 60 is pivotally mounted on a shouldered screw 61 and the end 60ᵇ of this lever is normally positioned in cooperative relation with the tail of the dog 48. The lower end of the bar 57 has its notched end 59 positioned between locating pins 62, 63, carried by the lever 60. A spring 64 secured to the lever at 65 and to the frame at 66 urges the lever 60 in a counter-clockwise direction against a stop stud 75, as shown in Figure 9.

Figure 2:
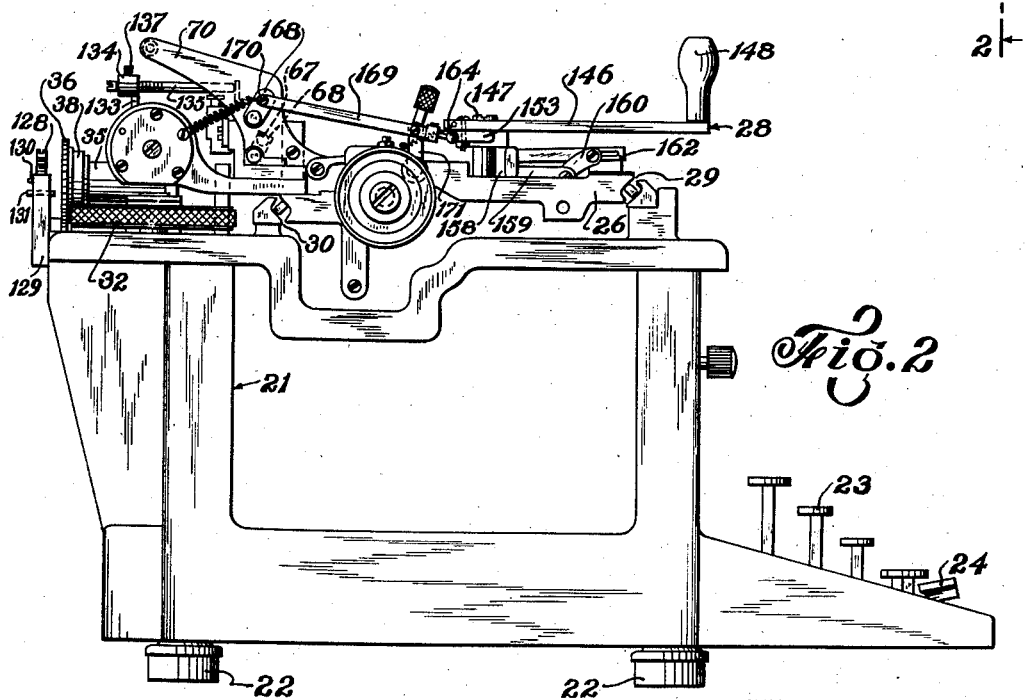
Figure 2 is an end elevation of the typewriter as viewed along the line 2—2 of Figure 1.

A rod 67, which is normally positioned near the roller 55, is pivotally supported on the carriage by means of cranks 68 and 69 pivoted in the end plates 70 and 71 of the carriage. These cranks and their relation to the rod 67 and the end plates 70 and 71 may be seen in plan view in Figure 3, and the crank 68 may be seen in Figure 2. The crank 69 has its shaft extended, and the boss 72 of a lever 73 is secured to said extended shaft by means of a pin 74.

Figure 8:
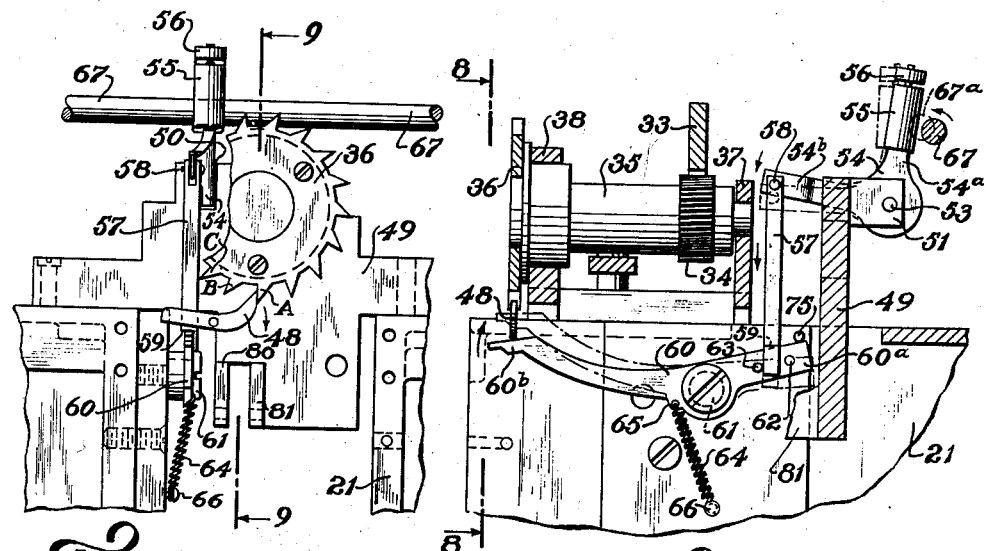
Figure 8 is a rear view of the escapement mechanism showing the control of one of the escapement dogs for freely moving the carriage.
Figure 9:
Figure 9 is an elevation, partly in section, taken along the line 9—9 of Figure 8.

When the lever 73 is actuated to release the carriage, the rod 67 is moved in the direction shown by the arrow in Figure 9 to the dotted position 67a shown in said figure, thereby moving the bell crank 54 in a counter-clockwise direction and causing the bar 57 to move the lever 60 to the position shown in dot and dash lines in Figure 9. This movement causes the engaging end of the dog 48 to move in the direction of the arrow shown in Figure 8, as a result of which said dog assumes the position shown in dot and dash lines, Figure 10, leaving the escapement wheel free to be rotated in either direction by the movement of the carriage, after which the carriage may be moved to any desired position.

When the lever 73 is released, a spring (not shown) returns it to its normal position. At the same time the spring 64 urges the lever 60 back to its normal position, and simultaneously the bar 57 and bell crank 54 associated therewith are in turn moved to their original normal positions. As the lever 60 returns to its normal position the dog 48 is free to return to its normal position in contact with its stop, due to the urge of a spring provided for that purpose on the dog rocker 39. This spring and stop are not shown in detail as they or their equivalents are present in all modern typewriters. The carriage also carries a marginal rack or bar 76 having mounted thereon settable stops 77 and 78. The stop 78 defines the left marginal line of the work and controls the stopping of the carriage, and at the right-hand margin of the work the stop 77 locks the keys against any further strokes. However, in cases where it is desired to type several additional characters at the end of a line, a (right-hand) marginal release key (not shown) effects the release of the carriage from the stop 77 as follows:

Details of this marginal release are clearly shown in Figures 6 and 7. Projecting outwardly, as viewed in Figure 6, from the auxiliary frame 49, are parallel bosses 80 and 81. The composite lever, generally designated by the numeral 82, has a lower element 83 mounted on a pivot pin 84 supported by the bosses 80 and 81.

The element 85 is pivotally mounted at the upper end of the element 83 on a pivot pin 86 carried by the element 83, so that the composite lever 82 may be bodily moved about the pivot 84 from its normal position to assume the position shown in dot-dash lines in Figure 7. In this instance, both the element 83 and the element 85 move as a unit.

An arm 87 formed integral with or secured to a base 88 is mounted on the right side of the element 85, as viewed in Figure 6, suitable fastening means such as screws 89 being provided for securing the base 88 to the element 85.

A lever 90 may be pivoted on the auxiliary frame by means of a pivot pin 91. The upper end of the lever 90 is normally in cooperative relation with the end of the arm 87; and the other end of the lever 90, which is broken away and not shown in the drawings, may be linked to the usual key-lock mechanism of the typewriter.

The upper end of the element 85 is provided with a round boss 92, which is normally positioned adjacent to the bar 76, suitable clearance being provided between the boss 92 and the stop member 77 so that it may be engaged by said stop member when the carriage is moved to the extreme position to the left (which is to the right as viewed in Figure 6).

Figure 6 shows the positions of the stop member 77 and the element 85 with its boss 92 and arm 87 at the point of first engagement. After several additional characters have been struck, the stop 77 and the element 85 assume the relative positions shown in dot-dash lines, with the result that the arm 87 actuates the lever 90 to effect the locking of the key action.

The element 83 is provided with a cross arm 93, and an engaging member 94 has a hooked end 95 adapted to actuate the composite lever 82 to move the same to the position shown in dot-dash lines in Figure 7. The engaging member 94 is secured to the usual marginal release key of the typewriter.

A pin 96 in the auxiliary frame 49 limits the movement of the element 85 in a counter-clockwise direction about the pivot 86, and the element 85 is urged in this direction by means of a spring 97 having one end secured to the boss 81, and having its other end provided with a suitable bumper 98 engaging the element 85. A pin 99 is also provided for limiting the movement of the element 85 in a clockwise direction about the pivot 86.

A suitable spring 100 is provided for holding the composite lever 82 in its normal position about the pivot 84 and relative to the bar 76 and the stop member 77. The spring 100 has one end secured to a pin 101 on the auxiliary frame member 49. The other end of the spring 100 is secured to the lever in a suitable manner at 102.

Referring now to Figure 5, the main carriage stop control member, designated generally by the numeral 79, consists of a metallic bar having a bore 103 formed therein, by means of which said control member may be pivotally mounted on the auxiliary frame member 49 which mounting will presently be described. The upper portion 104 of the bar has formed therein at its upper end, a notch 105, and has extending to the left, as viewed in Figure 5, an arm 106 adapted to control the disengagement of a ratchet on the carriage-return lever, in a manner to be presently described.

Positioned at the upper end of the lever within the notched portion, a suitable adjustable engaging member is provided. This member has a threaded shank 108 which screws into the upper end of the bar 104, and when the desired adjustment is obtained, may be locked in such adjusted position by means of a locking screw 109. The main stop control member has its bore 103 journalled on a shouldered screw 110 which is threaded into the auxiliary frame or support, the threaded portion being indicated by the numeral 111. A lug 112 (see Fig. 4) is secured to the frame member 49 by means of a screw 113, which lug is provided for limiting the movement of the stop control member 79 about its pivot in a clockwise direction.

The settable stop 78, carried on the bar 76, has secured thereto an extension 114 carrying a pivotally mounted roller 115 which is adapted to engage the engaging member 107. A margin stop 78 is adjustable along the bar 76 to obtain the desired left hand margin on the work sheet or the point where the returning carriage is ultimately arrested to start a new line of writing.

As the carriage in its return movement reaches this point of ultimate arrest, the roller 115 engages the member 107, and in order to permit the returning carriage to pass beyond this point of ultimate arrest, the stop control member 79 is adapted to move pivotally in a counter-clockwise direction on the screw 110, as viewed in Figure 4.

The arm 106 (Figure 5) of the stop control member 79 has a link 116 pivotally connected thereto by means of a pivot 117. The link 116 is in turn connected at its lower end to an arm 118 by a ball and socket joint 119.

Figure 10:
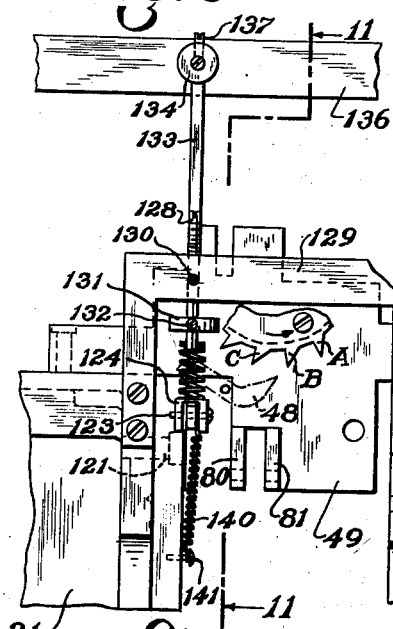
Figure 10 is a rear view of the mechanism associated with the main stop control element for releasing a ratchet member carried by the line-spacing and carriage-return lever; and showing the normally effective dog of the escapement disassociated from the escapement wheel.
Figure 11:
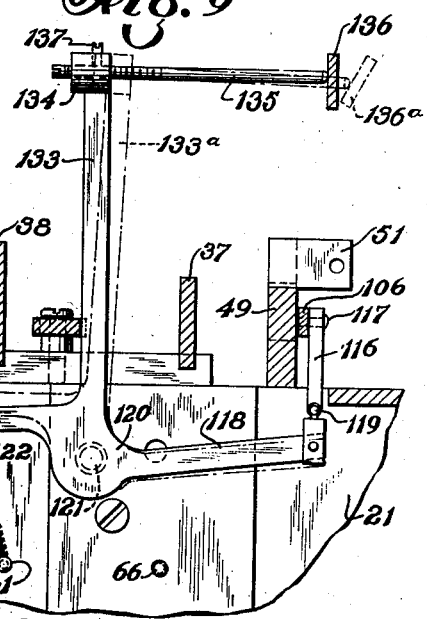
Figure 11 is a view, partly in section, taken along the line 11—11 of Figure 10.

The arm 118 forms an extension from a hub 120, and said hub is pivotally supported on the frame by means of a pivot pin 121 as may be seen in Figs. 10 and 11. An arm 122 is formed integral with and extends from the hub 120, and the arm 122 is provided at its outer end 122ª with a pivot pin 123. The pivot 123 serves to operatively connect a yoke 124 to the arm 122.

The details of the yoke 124 and parts associated therewith are shown in Figure 121. The yoke 124 has a shank 125 which extends upwardly into the bodies of springs 126 and 127. The spring 126 is wound in one direction; and the spring 127 is wound in an opposite direction; so that the spring 126 may nest into the spring 127. The spring 127 is substantially heavier than the spring 126; and the spring 126 is substantially longer than the spring 127.

A spring 140 (see Fig. 11) has one end secured to the arm 122 and the other end is secured to a pin 141 in the frame. In some cases the spring 126 may be omitted and a spring 140 substituted therefor. In other cases, both the spring 126 and the spring 140 may be retained.

A stop screw 128 is threaded into an arm 129 of the frame, thereby permitting the distance between the end of the shank 125 and the lower end of the screw 128 to be adjusted. After the desired adjustment is obtained, the screw 128 may be locked relative to the arm 129 by means of a set screw 130. A threaded collar 131 having threads fitting the threads of the screw 128 is provided for adjusting the compression to any desired value, and after such adjustment is obtained, such setting may be retained by locking the member 131, a set screw 132 being provided for the purpose.

The hub 120 has extending vertically therefrom an arm 133 carrying at its upper end a boss 134 as may be seen in Fig. 11. The boss 134 is provided with a threaded hole which carries an adjustable screw 135. The end of the screw 135 may be set in cooperative relation with a bar 136 which will presently be described, and after a desired adjustment is obtained the screw 135 may be locked relative to the boss 134 by means of a lock screw 137.

The arm 122 is normally positioned beneath the tail end of the dog 48, so that when the roller 115 carried by the adjustable stop 78 engages the member 107 carried by the main stop control member 79 (Figures 4 and 5), the member 79 is moved counter-clockwise, as viewed in Figures 4 and 5, to a position such as that shown in dot-dash lines in Figure 5, with the result that this motion will be transmitted via the link 116 to the arm 118, causing the hub 120 (Figure 11) to move in a clockwise direction—for example, to a position such as that shown in dot-dash lines in Figure 11.

The arm 122 is formed integral with the hub 120, therefore, the movement of said hub in a clockwise direction, described above, will cause the arm 122 to swing upwardly, as shown in Figure 11. This upward movement of the arm 122 raises the tail end of the dog 48 to disengage the other end thereof from the teeth of the escapement wheel 36 and at the same time this upward movement of the arm also compresses the spring 126 until the threaded collar 131 contacts the spring 127. It will be clear that further movement of the arm 122 will then continue to compress both the spring 126 and the spring 127 (in cases where two springs are used).

Now, due to the movement of the stop control member 79 to the dotted position shown in Figure 5, the returning carriage is permitted to pass beyond its point of ultimate arrest, and in cases where the returning carriage has acquired considerable momentum, the movement of the carriage beyond said point may amount to a distance greater than one escapement tooth on the escapement wheel, due to the fact that the arm 122 is at that time holding up the tail end of the dog 48. As soon as the momentum of the carriage is absorbed by the springs 126 and 127, the reaction of these springs and the action of the spring drum 32 moves the carriage back in the opposite direction, during which movement the dog 48 is retained out of engagement with the teeth of the escapement wheel. As soon as the carriage thus moves back to the right, as viewed from the front of the machine, to its point of ultimate arrest, the arm 122 disengages the tail of the dog 48 to allow the other end of this dog to engage the tooth of the escapement wheel 36 and arrest further movement of the carriage.

As the escapement dog 48 is disengaged from the escapement wheel during the time that the carriage is beyond its point of ultimate arrest, the pull of the main spring in the drum 32 also lends its effort to abet the springs 126 and 127 in absorbing the momentum of the carriage. As stated above, when the momentum of the carriage is absorbed, the carriage then moves toward the right as viewed from the front, under the recoil of the springs 126 and 127 and under the urge of the main spring in the drum 32, due to the fact that the dog 48 is at that time disengaged from the escapement wheel 36. The extent of this movement may be one or more than one letter spaces, and depends on the degree of momentum acquired by the returning carriage.

It might also be stated that some of the momentum is also consumed in moving the linkages between the stop control member 79 through the medium of the members 106, 116, 118 and 122, especially in view of the fact that these linkages lie in two planes in the typewriter and are positively linked together between the planes, the ball joint 119 forming a part of said positive linkage.

The engaging member 107 may be screwed in either direction in its support in order to accurately set said linkages to control the engagement and disengagement of the dog 48 in accordance with definite positions of the carriage.

An important feature of the invention lies in the fact that the linkages between the stop control member 79 and the dog 48 are positively associated with each other, and may be adjusted to positive and predetermined settings.

Referring to Figures 1 and 8, it will be noted that the movement of the carriage (to the left, as viewed in said figures) throughout the length of the carriage and up to the point where the roller 115 carried by the left marginal stop 78 contacts the engaging member 107, the escapement wheel 36 is moved in a counter-clockwise direction, and in so moving, the teeth of the escapement wheel successively force the engaging end of the dog 48 downwardly (as viewed in Figure 8). Therefore, when the carriage is moved by hand to the left (as viewed in Figures 1 and 8), it moves freely up to the point where the roller 115 contacts the engaging member 107 carried by the stop control lever 79. From this point on (the carriage continuing to move toward the left as stated), the stop control lever 79 is moved by the carriage and, through the medium of the linkages 106, 116, 118, 120 and 122, raises the tail end of the dog 48, and by the time the tip of the engaging end of the dog has cleared the peripheral circle of the ends of the teeth of the escapement wheel 36, said teeth have moved to such position that the engaging end of the dog is approximately half way between one escapement tooth and the next. And as the carriage continues moving to the left, the escapement teeth may advance to the position shown in Figure 10, or even beyond if the momentum of the carriage is sufficiently great. It will be noted in Figure 8 that the escapement dog 48 is normally engaging the escapement tooth marked A, whereas in Figure 10 it will be noted that the escapement tooth A is advanced in a counter-clockwise direction to a point where the escapement tooth B is in the vicinity of the tip of the dog 48, and, as stated above, where the momentum of the carriage is sufficiently great, the escapement teeth may advance still further to positions where the engaging end of the dog 48 is in line with a point between the tooth B and the tooth C. However, for all positions of the carriage beyond the final stop position (left marginal line), the engaging end of the dog 48 is held out of the range of the escapement teeth by the arm 122. Since the engaging end of the dog 48 is held out of the range of the escapement teeth during this time, both the urge of the main spring 32, and the recoil of the shock-absorbing means pulls the carriage in the opposite direction as soon as the momentum is absorbed, and when the final stop position is reached, the stop control member has at that time moved back to its normal position and the linkages associated therewith have also moved back to their normal positions, thereby placing the engaging end of the dog 48 in position to engage a tooth of the escapement wheel. In some cases it may be desired to nullify the effect of the main spring at that time as will later be described. While the carriage is moving under the urge of the recoil of the shock-absorbing means only, or under the urge of both the shock-absorbing means and the main spring, the escapement wheel is moved in a clockwise direction as viewed in Figure 8, through the medium of the rack 33 and the pinion 34 to such position that the engaging end of the dog 48 re-engages the escapement wheel tooth A.

With the linkages properly adjusted to function as outlined above, the dog 48 will always re-engage the initial escapement wheel tooth— for example, the tooth A—for the setting of the left marginal stop 78 illustrated. When the marginal stop 78 is set in other positions, of course the initial point will coincide with others of the escapement wheel teeth. Each time the carriage is returned, it will consistently stop at the same position, thereby making the first character in each line on the paper carried by the carriage fall on a straight line parallel to the left edge of the paper.

It may be pointed out that the degree of control of the new and improved stop control member 79 is so flexible that it will effect control over the returning carriage, whether the carriage is returned from the point one-letter space away from the initial point or from a point a maximum number of spaces away from the initial point.

In the appended claims, the expression "point of ultimate arrest" may be taken to mean the point where the carriage finally stops in position for the operator to begin typing a new line. The expression "momentum stop" may be taken to mean the point beyond the final stop at which the returning carriage loses all of its momentum and momentarily comes to rest before starting back in the opposite direction under the urge of the main spring of the typewriter. The point at which this occurs varies in accordance with the momentum of the returning carriage.

The present machine also includes means, in effect, for shutting off the power supplied by the hand of the operator in returning the carriage. This is accomplished by having the stop-control member, in addition to performing the functions outlined above, also effect control over the line spacing and carriage return lever.

The line spacer and carriage return lever 146 is pivotally mounted on a shouldered screw 147 carried by the carriage frame. A freely rotatable handle is pivotally mounted on a stud 149 carried at the outer end of the lever 146. The end of the stud 149 is threaded, and the handle 148 may be retained on the stud by means of the nut 150 engaging the threaded end of the stud 149 (see Figure 19).

The pivoted end of the lever 146 is preferably made in the form of a semi-circle 151 and carries a shouldered screw 152 which forms a pivotal support for a pawl member 153. Therefore, the pawl member 153 is bodily movable with the lever 146.

The shouldered screw 147 also carries a ratchet member 157 which has formed integral with or secured thereto an extending member 158 which actuates the line spacing mechanism associated with the platen 27 carried by the carriage 26. The extending member 158 (referring now to Figure 3) pivotally carries a lever 159 which is operatively connected to a bell crank 160. The bell crank 160 is pivotally supported on the carriage 26 and is urged to its normal position (toward the keys) by means of a spring 161. A link member 162 is pivotally connected to the bell crank 160 and to the usual pawl and ratchet line spacing mechanism, generally designated by the numeral 163.

The surface 153a of the pawl 153 is radial with respect to the center of the shouldered crew 147 so that as the lever 146 is rotated on the screw 147 as a pivot, the relative relation of the surface 153a with respect to the engaging member or ball 164 is the same.

The normal position of the lever 146 is shown in dot-dash lines, designated by the numeral 146a, and a spring 178 is provided for returning the lever 146 to its normal position.

Figure 15 shows the ratchet member 157 in its normal position and engaged by the pawl 153 when the lever 146 is in its normal position (for example, position 146a in Figure 14). As soon as the lever 146 begins to move toward the position 146b, the ratchet member 157 starts moving in the direction of the arrow, and by the time the lever 146 is at the position 146b, a line space has been accomplished and the ratchet member 157 is in the position shown in Figure 16. At the same time, due to the fact that the lever 146 is in the position 146ᵇ, the pawl is at that time also in the position shown at Figure 16. In this connection, it will be noted that the tail of the pawl 153 is within the range of the ball 164. As the operator continues to move the lever 146 (which is now in the position 146ᵇ, Figure 14) in the direction of the arrow, the carriage begins to move under the urge of the energy supplied by the operator until the marginal stop roller 115 contacts the contact member 107 and causes the stop control member 79 to move. This movement, through the medium of the arm 133 and the adjustable screw 135 is imparted to the bar 136, and thence via the linkages between the bar 136 and the ball 164; this motion is in turn imparted to the ball member 164 causing it to engage the tail of the pawl 153, and thereby disengage the engaging end of the pawl from the ratchet member 157. At this moment, due to the action described above, any further effort exerted by the operator results in the movement of the lever 146 toward the position shown in solid lines.

Figure 17 illustrates the relation of the pawl and the ratchet member at this particular instance. Due to the release of the pawl 153, the lever is free to turn on the screw 147, and the lever and the pawl 153 with it may assume a position relative to the ratchet member 157, such as that shown in Figure 18.

Figure 3:
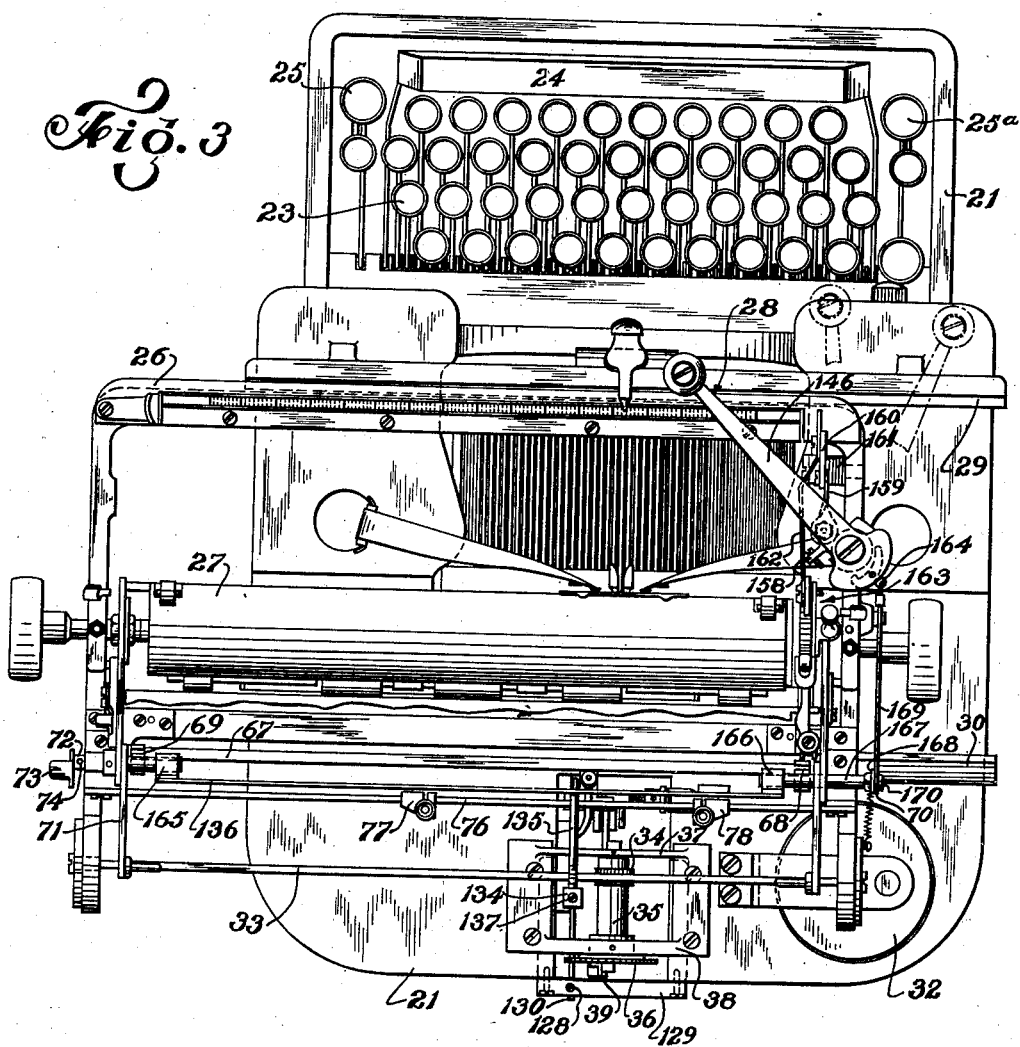
Figure 3 is a complete plan view of the typewriter shown in Figures 1 and 2.

Reviewing the above few paragraphs, when it is desired to move the carriage to its initial starting point—that is to say, to a given point adjacent to the left margin of the paper carried by the carriage—the handle 148 is engaged by the operator's hand and is moved to the right, as viewed in Figure 3 from the keyboard end. During the first stage of this movement in which the lever moves from the position 146ᵃ to the position 146ᵇ (see Figure 14), line spacing of the platen is effected. This is due to the fact that the pawl 153 engages the notch of the ratchet member 157; and due to this engagement, the ratchet member 157 is rotated in the direction of the arrow; and through the medium of the line spacing mechanism associated with the extending member 158, line spacing is effected. As the operator continues to press the handle 148 in the direction of the arrow, the handle being in the position 148ᵇ, the carriage is moved in the direction to finally bring the left marginal stop in registration.

As soon as the roller 115 engages the engaging member 107, the stop control member 79 begins to move; its movement is imparted to the hub 120 and the lever 133 extending from said hub assumes the position shown in dot-dash lines at 133ᵃ, as shown in Figure 11, with the result that the bar 136, which is pivotally mounted on the carriage, is tilted to the position 136ᵃ shown in dot-dash lines in Figure 11.

The bar 136 (referring now to Figure 3) is pivotally mounted on the carriage at the points 165 and 166, forming a pivot 166. The bar 136 has formed integrally therewith and passing through the pivot 166, a shaft 167. The shaft 167 carries on its outer end a crank 168 and a bar 169 pivotally connected to the crank 168 by means of a shouldered screw 170, and carrying on its opposite end the engaging member or ball 164. A guiding link 171 is pivotally mounted on a stud 172, carried by a boss 173 on the carriage frame, and is also pivotally connected to the bar 169 by means of a shouldered screw 174.

When the bar 136 is tilted, under control of the stop control member 79, in the manner described above, it, through the medium of the shaft 167, the crank 168, the push-rod 169, and the engaging member 164, disengages the pawl 153 from the notch in the ratchet member 157, thereby releasing the lever and permitting it to move freely on the shouldered screw 147. As a result of this, the operator's hand ceases to move the carriage; the operator's hand does not receive the impact of the carriage suddenly coming against a solid stop; and the operator's fingers, due to the rolling action of the handle, roll off and become disengaged from the handle. While this is occurring, the momentum of the returning carriage is absorbed between the point of final stop and the point beyond said stop where all of the momentum of the carriage is absorbed, followed by the movement of the carriage from the point where the momentum ceases and the final stop which occurs under the urge of the main spring.

As a further modification of the invention (referring now to Figure 22), the yoke 124ᵃ, corresponding to the yoke 124 may be provided with a buffer 175 of suitable resilient material, and the stop screw 128ᵃ may carry a similar buffer 176, and the distance between these buffers may be regulated by means of the screw portion 128ᵃ which is threaded into the frame member 129. After a desired adjustment is obtained, it may be retained by means of a set screw 130. The spring 127ᵃ is positioned between 124ᵃ and the flanged portion 177 of the screw member 128ᵃ, the flange is, of course, moved relative to the spring 127ᵃ when the screw 128ᵃ is adjusted, as described above.

With this arrangement, when the stop control member 79 is engaged by the stop roller 115 carried on the carriage, the spring 127 is compressed in the same manner as described above, and the buffers 175 and 176 may come together in cases where the momentum is sufficiently great without causing noise.

In order to remove the urge of the main spring from the carriage during the time the carriage has passed beyond (in the direction the carriage is returned) its point of ultimate arrest, the mechanism illustrated in Figures 23 to 26 is provided. This mechanism is shown in separate figures so as not to make the other figures confusing.

As the recoil of the shock-absorbing means associated with the stop control member 79 returns the carriage from the point in said zone in which the momentum of the carriage has been absorbed to the point at which the new line shall begin, and as the main spring would also add its effort in the same direction, it may in some instances be advisable to remove the urge of the main spring during this time. The spring drum 32 has a plurality of ratchet teeth 180 formed about the periphery of one flange thereof. A ratchet lever 181 is pivotally mounted on said frame, for example by means of the pivot screw 182. The ratchet teeth are adapted to be locked by the ratchet lever in the direction of urge of the main spring, as shown by the arrow. In the opposite direction the teeth are free to move ratchet-wise. A suitable guide block 183 is secured to the frame at a point adjacent to where the pawl engages the teeth 180, said guide block having formed therein a slot 184 in which the pawl lever 181 is freely movable. A spring 185 has one end secured to the pawl 181 and the other end secured to a post 186, normally tending to urge the engaging end 187 of the pawl lever into engagement with the teeth 180. A suitable stop 188 on said frame prevents the end 187 from meshing too deeply with the teeth 180. The arm 133, when in its normal position is in contact with the pawl lever 181 and normally holds the engaging end 187 of this lever out of engagement with the teeth 180.

When the stop control device is actuated by the marginal stop 78, in the manner previously described, the lever 133 is moved to the position shown in dot-dash lines and indicated by the numeral 133ᵃ. While the lever 133 is moving in the manner just described, the pawl lever 181 which normally bears against the arm 133 also moves and the end 187 engages one of the teeth 180, the pawl lever assuming the position shown in dot-dash lines in Figures 23 and 25 in which, as aforesaid, it does not lock the drum of the main spring against rotation in the direction of advancement of the carriage to the decelerating zone.

However, due to the engagement of a tooth 180 by the end 187 of the pawl member, the urge of the main spring, via the cable 31, is nullified and as long as the end 187 engages the tooth 180 the main spring exerts no pressure upon the carriage.

As soon as the momentum of the returning carriage is absorbed by the shock-absorbing member, the recoil of the shock-absorbing member causes the carriage to move in an opposite direction for a space equal to one or more teeth, or fractions thereof, in order to bring the printing point on the carriage in line with the printing position. Due to the short space in which the carriage moves at this time, and due to the fact that the urge of the main spring is removed from the carriage, the carriage is brought to a stop at the initial point without shock or rebound.

Although the new and improved stop control means of the present invention is shown in connection with a typewriter in which the normally engaged dog is moved out of the range of the teeth of the escapement wheel, it may also be applied to various other types of typewriters.

In some types of machines, the normally engaged dog is not moved out of the range of the teeth of the escapement wheel in the manner described, and instead employ a pawl and ratchet on the escapement wheel shaft. An example of this is the Remington model, No. 16 typewriter.

In applying the control means of the present invention to a machine of this character, the mechanism would be so arranged that instead of moving the normally engaged dog out of the range of the teeth of the escapement wheel, the mechanism would disengage the pawl from the ratchet. Basically, this principle is the same because the relation between the escapement wheel teeth and the movable ratchet dog, which has been shown herein, is a pawl and ratchet effect. In other words, the present stop control mechanism may be used to control either a pawl or a dog.

Although the invention has been disclosed in connection with the specific details of preferred embodiments thereof, it must be understood that such details are not intended to be limitative of the invention except insofar as set forth in the appended claims.

What is claimed is:

1. In a typewriting machine, a frame, a carriage movable along said frame, an escapement wheel, mechanism between said escapement wheel and said carriage, a settable member for predetermining the position of the left marginal line of the printing, spacing means for said carriage associated with said escapement wheel and including a normally engaged dog and a normally disengaged dog, a dog rocker supporting said dogs, and mechanism associated with said normally engaged dog and engaged by said settable stop for disengaging said dog from said escapement wheel while said dog rocker is stationary and thereby permitting said carriage to move in a zone to the left of said left marginal line.

2. In a typewriting machine, a frame, a carriage movable along said frame, an escapement wheel, mechanism between said escapement wheel and said carriage, a settable member for predetermining the position of the left marginal line of the printing, spacing means for said carriage associated with said escapement wheel and including a dog rocker and a dog normally engaging said escapement wheel and mounted for movement relative to said dog rocker to a position out of engagement with said escapement wheel, and mechanism associated with said dog and operated by said settable stop for thus moving said dog relative to said dog rocker, thereby permitting said carriage to move in a zone to the left of said left marginal line.

3. In a typewriting machine, a frame, a carriage, an escapement therefor including an escapement wheel and a normally engaged dog in cooperative relation therewith, a dog rocker pivotally mounted on said frame and pivotally supporting said dog, a settable member on said carriage for defining an initial position at which typing shall begin, a control device carried on said frame adapted to be engaged by said member, means linking said device and said dog for pivotally moving and disengaging said dog from the escapement wheel while said dog rocker is stationary and while said settable member is in contact with said control device, and shock-absorbing means associated with said control device for decelerating said carriage while the same is beyond the position at which said settable member first contacts said control device and for moving said carriage back to said position under urge of the reaction of said shock-absorbing means.

4. In a typewriting machine, a frame, a carriage, an escapement therefor including an escapement wheel and a normally engaged dog in cooperative relation therewith, a dog rocker pivotally mounted on said frame and pivotally supporting said dog, a settable member on said carriage for defining the initial starting point of the typing with respect to the printing position of the type, a stop control device pivotally mounted on said frame and adapted to be engaged by said member from the time the carriage moves its initial starting point beyond said position until it returns said point to said position, linkages extending directly between said device and said dog on said escapement for disengaging said dog from and freeing the escapement wheel during the time said point is beyond said position, and resilient means associated with said device for decelerating said carriage while said point is beyond said position and for moving said carriage back to bring said initial starting point in registration with said position.

5. A typewriting machine according to claim 4, in which a main spring drum supported on said frame is associated with said carriage, said drum having a series of teeth peripherally arranged thereon, and in which mechanism cooperating with said linkages engages at least one of said teeth during the time the initial starting point on said carriage is beyond said position to prevent the urge of the main spring being imparted to said carriage while the latter is permitted to move back to bring said initial starting point to said position.

6. In a typewriting machine, a frame, a carriage, an escapement therefor including an escapement wheel, a normally engaged dog and a normally disengaged dog in cooperative relation therewith, a dog rocker pivotally mounted on said frame and pivotally supporting said normally engaged dog, a lever member pivotally mounted on said frame, a settable member on said carriage for defining the left marginal line of the typing with respect to a given position on said frame, said last member being adapted to engage said lever when the carriage being returned to begin a new line moves its left marginal line beyond said position, positive linkages between said lever member and said normally engaged dog adapted to pivotally move said dog in a definite ratio to the movement of said lever while said rocker is stationary and to maintain said dog out of the range of the teeth of the escapement wheel as long as said lever member is engaged by said settable member thereby permitting said returning carriage to move said left marginal line beyond said position a distance varying with the momentum of the returning carriage, and shock-absorbing means associated with said lever member for absorbing the momentum of the carriage after its marginal line has passed said position, the reaction of said shock-absorbing means being adapted to move the carriage from the point at which its momentum is absorbed to the point at which said left marginal line reaches said position and said settable member permits said lever member to return to its normal position and said normally engaged dog re-engages the escapement wheel tooth with which it was engaged prior to the movement of said lever member.

7. In a typewriting machine having a frame, a carriage movable along said frame, an escapement wheel geared to said carriage, a dog rocker pivotally mounted on said frame, a first dog pivotally mounted on said dog rocker and normally engaging the teeth of said escapement wheel, a second dog on said dog rocker and adapted to be brought into cooperation with said teeth when said rocker is rocked, a stop control member pivotally mounted on said frame and having mechanism associated therewith in cooperative relation with said first dog, a settable marginal stop on said carriage for defining the left marginal line of the typing with respect to the printing position of the type, said stop being adapted to engage said control member when the carriage is being returned to begin a new line moves its left marginal line beyond said printing position and thereby through said mechanism pivotally moves and disengages said first dog from the escapement tooth with which the latter was engaged when said marginal line reached said position, permitting said carriage to move its marginal line in a zone beyond said printing position, and resilient means associated with said control member for absorbing the momentum of the returning carriage in said zone and for moving the carriage in an opposite direction from the point in said zone where said momentum was absorbed to said printing position where said control member, through said mechanism, may re-associate said first dog with the escapement tooth with which it was last associated.

8. In a typewriting machine, a frame, a carriage, a main spring drum mounted on said frame and adapted to urge said carriage along said frame in one direction, an escapement for said carriage including an escapement wheel and dogs in cooperative relation therewith, settable means on said carriage for defining the left marginal line of the typing with respect to the printing position of the type, control means on said frame adapted to be engaged by said settable means from the time the carriage moves said left marginal line beyond said printing position until it returns to said printing position, linkages between said control means and at least one of said dogs for disengaging said dog from and freeing the escapement wheel during the time said carriage has moved its marginal line beyond said printing position, engaging means associated with said control means for removing the urge of said main spring from said carriage during the time said escapement wheel is free, and shock-absorbing means associated with said control means and adapted to decelerate said carriage after its marginal line passes beyond said position and adapted to react against said carriage and to move the same back to bring said left marginal line to said printing position after the carriage is decelerated.

9. In a typewriting machine, a frame, a carriage, a main spring drum mounted on said frame and adapted to urge said carriage along said frame in one direction, an escapement for said carriage including an escapement wheel and dogs in cooperative relation therewith, a dog rocker supporting said dogs, settable means on said carriage for defining the left marginal line of the typing with respect to a definite position on said frame, control means on said frame adapted to be engaged by said settable means from the time the carriage moves its left marginal line beyond said position until it returns to said position, linkages between said control means and one of said dogs for disengaging the same from and freeing the escapement wheel while said dog rocker is stationary and permitting said carriage to move said line beyond said position and for maintaining said dog in disengaged relation to the escapement wheel during the time said line is beyond said position, engaging means associated with said control means for nullifying the urge of said main spring upon said carriage during the time said line is beyond said position, and shock-absorbing means associated with said control means and adapted to decelerate said carriage after said line passes beyond said position and adapted to react against said carriage and to move the same back to bring said left marginal line to said position after the carriage is decelerated.

10. In a typewriting machine, a frame, a carriage, a main spring drum mounted on said frame and adapted to urge said carriage along said frame in one direction, an escapement for said carriage including an escapement wheel and dogs in cooperative relation therewith, settable means on said carriage for defining the left marginal line of the typing with respect to a definite position on said frame, control means on said frame adapted to be engaged by said settable means from the time the carriage moves its left marginal line beyond said position until it returns to said position, linkages between said control means and one of said dogs for disengaging the same from and freeing the escapement wheel to permit said carriage to move said line beyond said position and for maintaining said dog in disengaged relation to the escapement wheel during the time said line is beyond said position, engaging means associated with said control means for nullifying the urge of said main spring upon said carriage during the time said dog is disengaged from said escapement wheel, and shock-absorbing means associated with said control means and adapted to decelerate said carriage after said line passes beyond said position and adapted to react against said carriage and to move the same back to bring said left marginal line to said position after the carriage is decelerated.

11. In a typewriting machine, a frame, a carriage, a main spring on said frame and connected to said carriage, a settable member on said carriage for predetermining the position of the left marginal line of the printing, a rack carried on said carriage, an escapement shaft, a pinion on said shaft in operative relation to said rack, an escapement wheel operatively connected to said shaft, a dog rocker pivotally mounted on said frame, a first dog pivotally mounted on said rocker and normally in engagement with a tooth of said escapement wheel, a second dog on said rocker, mechanism operatively connected to the first dog for pivotally moving and disengaging said dog from said escapement wheel while said rocker is stationary to permit the carriage to move freely in either direction, and a shock absorbing device on said frame connected to said mechanism and adapted to be engaged by said settable stop when said carriage is being returned to begin a new line of printing for disengaging said first dog from the escapement wheel teeth and permitting said carriage to move freely to the left of said left marginal line into a zone in which its momentum is absorbed by said shock absorbing means and to move back toward said left marginal line under the urge of the main spring until said left marginal line is again reached.

12. In a typewriting machine, a frame, a carriage, a rack carried on said carriage, an escapement shaft, a pinion on said shaft in operative relation to said rack, an escapement wheel operatively connected to said shaft, a dog rocker pivotally mounted on said frame, a first dog pivotally mounted on said rocker and normally in engagement with a tooth of said escapement wheel, a second dog on said rocker and normally out of engagement with the teeth of said escapement wheel, a control member mounted on said frame, linkages between said control member and said first dog for moving the latter in a definite ratio to the movement of said control member, and a settable member on said carriage for determining the initial starting point of the typing relative to a fixed position on said frame, said settable member being adapted to cooperate with said control member when said point on the returning carriage reaches said position, thereby pivotally moving and releasing said first dog from the escapement wheel while said rocker is stationary and permitting said carriage to move said point in a zone beyond said position.

13. In a typewriting machine, a frame, a carriage, a rack carried on said carriage, an escapement shaft, a pinion on said shaft in operative relation to said rack, an escapement wheel operatively connected to said shaft, a dog rocker pivotally mounted on said frame, a first dog on said rocker normally in engagement with a tooth on said escapement wheel, a second dog on said rocker, a control member mounted on said frame, linkages between said control member and said first dog, a settable member on said carriage for determining the initial starting point of the typing relative to a fixed position on said frame, said settable member being adapted to cooperate with said control member when said point on the returning carriage reaches said position, thereby releasing said first dog from the escapement wheel and permitting said carriage to move said point in a zone beyond said position, and shock-absorbing means associated with said control member for decelerating said carriage while said point is moving in said zone, the reaction of said shock-absorbing means being adapted to move said carriage in an opposite direction to return said point to said position and after deceleration has taken place.

14. In a typewriting machine, a frame, a carriage, a rack carried on said carriage, an escapement shaft, a pinion on said shaft in operative relation to said rack, an escapement wheel operatively connected to said shaft, a dog rocker pivotally mounted on said frame, a first dog on said rocker normally in engagement with a tooth of said escapement wheel, a second dog on said rocker, a control member mounted on said frame, linkages between said control member and said first dog, a settable member on said carriage for determining the initial starting point of the typing relative to a fixed position on said frame, said settable member being adapted to cooperate with said control member when said point on the returning carriage reaches said position, thereby releasing said first dog from the escapement wheel and permitting said carriage to move said point in a zone beyond said position, a spring drum carried on said frame and operatively connected to said carriage for urging said carriage along said frame while typing, and means associated with said control member for removing the urge of said spring from the carriage during the time the carriage is moving said point in said zone.

15. In a typewriting machine, a frame, a carriage movable on said frame, a main spring drum carried on said frame and operatively connected to said carriage for urging the carriage along said frame in the direction of typing, a settable member on said carriage, and means associated with said spring drum and adapted to be actuated by said settable member for removing the urge of said spring from said carriage while the latter is in a predetermined zone defined by said settable member.

16. A typewriting machine according to claim 4, in which said resilient means comprises a spring of minimum strength for holding said linkages in normal relation, thereby permitting said device to freely start said linkages into motion, and a second spring substantially stronger than said first spring and brought into play after said linkages have moved an initial distance.

SEYED KHALIL.